(No Model.) 3 Sheets—Sheet 1.

D. W. CARTER.
MOTOR FOR THE TRANSMISSION OF POWER.

No. 496,596. Patented May 2, 1893.

Witnesses
J. Edw. Maybee
W. J. McMillan

Inventor
David W. Carter
by Donald C. Ridout & Co.
Attys (No Model.) 3 Sheets—Sheet 2.
D. W. CARTER.
MOTOR FOR THE TRANSMISSION OF POWER.

No. 496,596. Patented May 2, 1893.

Witnesses
J. Edw. Maybee
W. G. McMillan

Inventor
David W. Carter
by
Donald C. Ridout & Co.
Attys (No Model.) 3 Sheets—Sheet 3.

D. W. CARTER.
MOTOR FOR THE TRANSMISSION OF POWER.

No. 496,596. Patented May 2, 1893.

Witnesses
J. Edw. Maybee
N. J. McMillan

Inventor
David W. Carter
by
Donald G. Ridout & Co.
Attys.

UNITED STATES PATENT OFFICE.

DAVID W. CARTER, OF STRATFORD, CANADA.

MOTOR FOR THE TRANSMISSION OF POWER.

SPECIFICATION forming part of Letters Patent No. 496,596, dated May 2, 1893.

Application filed May 27, 1892. Serial No. 434,529. (No model.)

*To all whom it may concern:*

Be it known that I, DAVID WELLS CARTER, of the city of Stratford, in the county of Perth, in the Province of Ontario, Canada, have invented a certain new and useful Motor for the Transmission of Power, of which the following is a specification.

The object of the invention is to provide a device to be placed between an engine or other driving power and the machine or machinery to be driven for the purpose of increasing the power of the engine or other driver, and it consists, essentially, of a shaft connected to the machine to be driven and having a T-head formed on it, two wrist-pins projecting from the head at equal distances from the center of the shaft each pin having a pinion journaled on it, one pinion meshing with an internal gear formed in the hub of the bracket supporting the shaft, and with the other gear which is fixed to a spur-wheel meshing with an internally geared pulley independently journaled and to which the driving power is applied; substantially as hereinafter more particularly explained.

Figure 1:
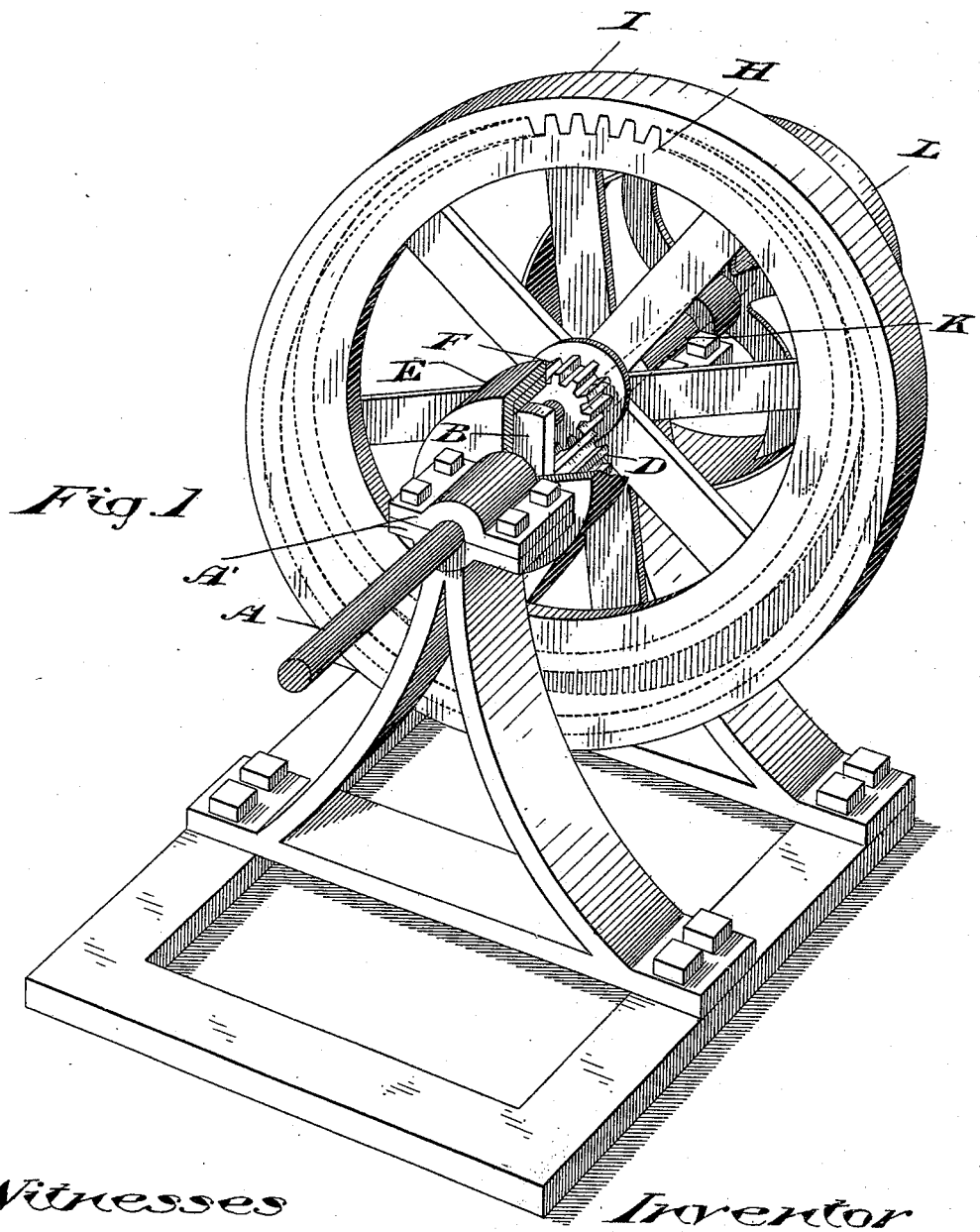
Figure 2:
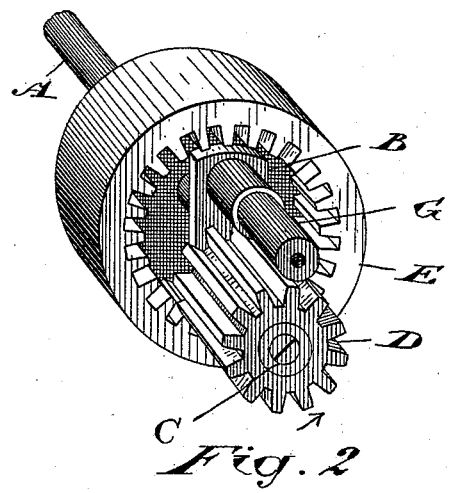
Figure 3:
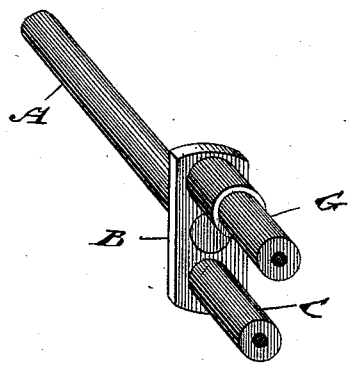
Figure 4:
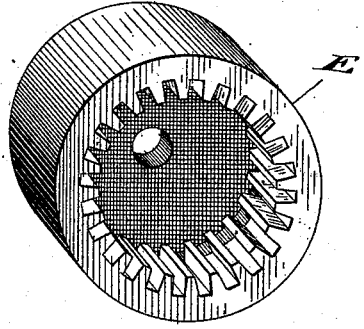
Figure 5:
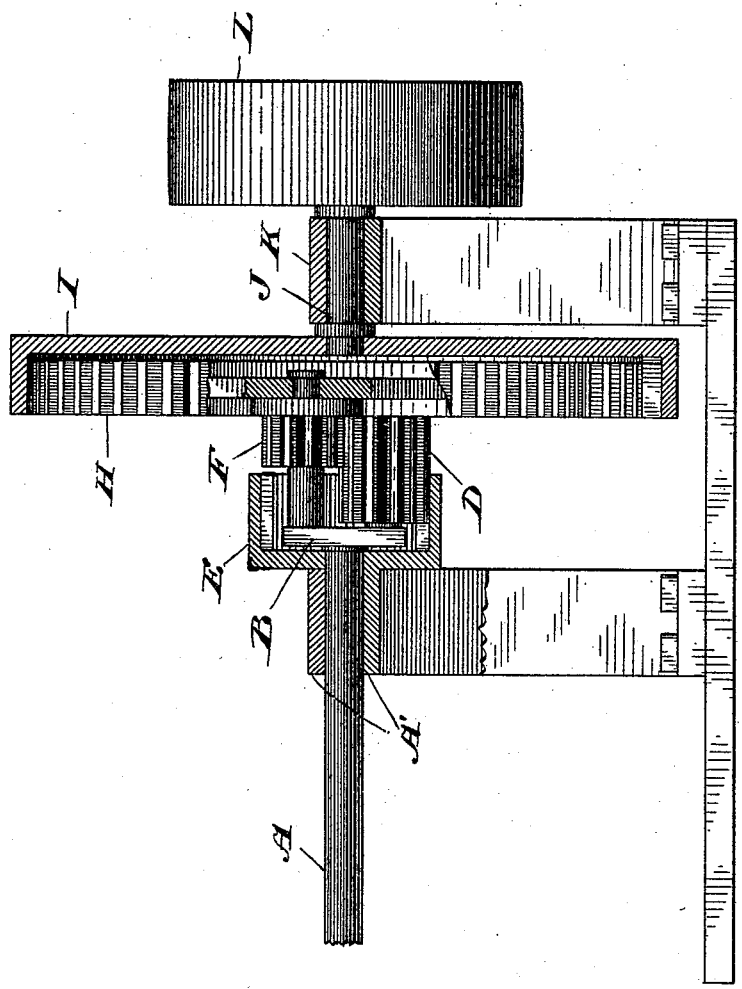

Figure 1, is a perspective view of my device. Fig. 2, is a perspective view of the T-headed shaft carried in its journal, but projecting out of the internally geared hub. Fig. 3, is a detail of the T-headed shaft. Fig. 4, is a view of the bracket with internally geared hub. Fig. 5 is a vertical central section.

A is the driven shaft which is journaled in the bearing A' and has a T-head B formed on its end. The bearing A' has a hub E formed integral with the lower half of said bearing A' and is therefore stationary. The upper half of said bearing is formed in the usual way, as best shown in Fig. 1.

C, is a wrist-pin attached to the T-head B, on which the pinion D, is journaled. This pinion is designed to engage with the internal gear formed inside of the hollow hub E, within which the T-head B, revolves. The teeth of the pinion D, project outside of the hub E, and mesh with the teeth of the pinion F, which is journaled on the wrist-pin G, at the same distance from the center of the shaft A, as the wrist-pin C. The pinion F, is fixed to the spur-wheel H.

A pulley I, is fixed to the shaft J, which shaft is suitably journaled in the bracket K, and has a driving pulley L, keyed to it from which pulley the driving belt extends to the engine or other driving motor.

It will be observed that the pulley I, has an internal gear formed around its rim with which gear the spur-wheel H, meshes.

When the shaft J, is caused to revolve by the engine or other driving motor, the pulley I, will naturally revolve with it, and in revolving, will cause the spur wheel H, to revolve likewise, and owing to the fact that the spur-wheel H, is carried on a crank, the meshing takes place at different points of the gear in the pulley I.

As the pulley F, fixed to the spur-wheel H, meshes with the pinion D, which engages with the teeth in the hollow hub E, the power applied to the driven shaft A, is greatly increased from that originally applied by the engine or other driving power.

What I claim as my invention is—

A shaft having a head, two wrist-pins projecting from said head at substantially equal distances from the center of said shaft, a pinion journaled on each wrist-pin, a stationary gear, one of said pinions meshing with said stationary gear and with the other pinion, which latter pinion is fixed to a spur-wheel, and an internally geared pulley with which the spur-wheel engages and to which the power is applied, substantially as and for the purpose specified.

Toronto, May 11, 1892.

DAVID W. CARTER.

In presence of—
A. M. NEFF,
DONALD C. RIDOUT.